June 26, 1923.　　　　　　　　　　　　　　　　　　　　1,460,072
J. D. MINTZ
STORAGE BATTERY
Filed Oct. 11, 1922
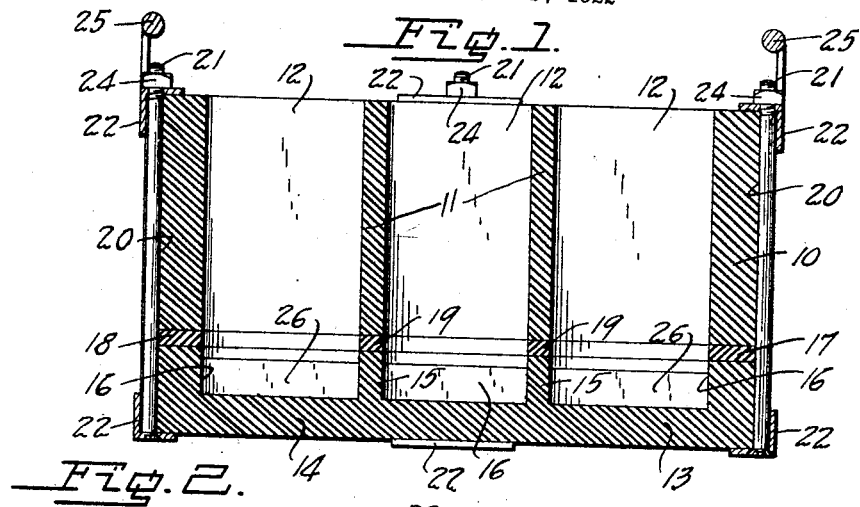
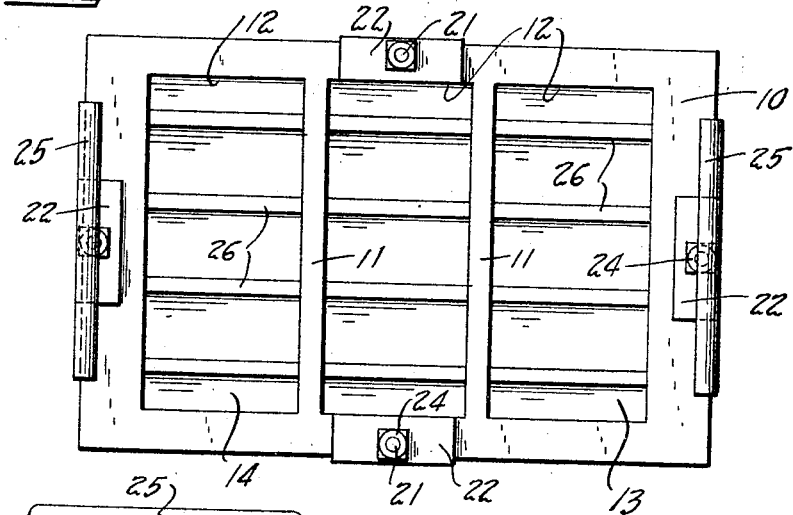
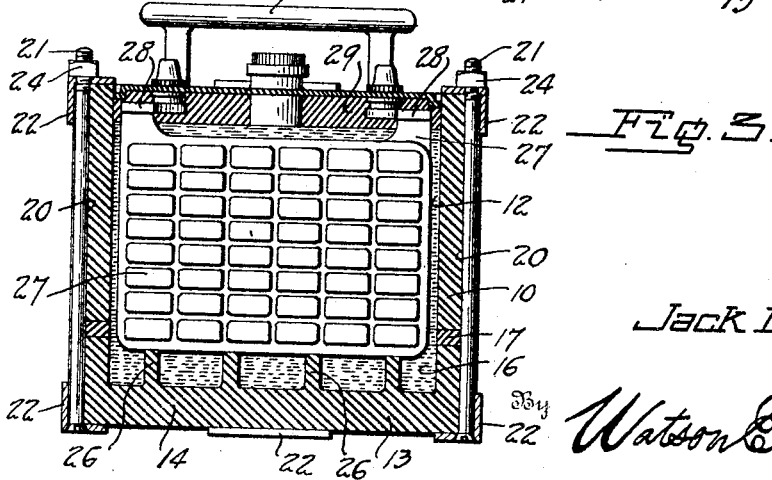
Inventor
Jack D. Mintz
By Watson E. Coleman
Attorney Patented June 26, 1923.

1,460,072

UNITED STATES PATENT OFFICE.

JACK D. MINTZ, OF NEW YORK, N. Y.

STORAGE BATTERY.

Application filed October 11, 1922. Serial No. 593,745.

*To all whom it may concern:*

Be it known that I, JACK DAVIS MINTZ, a citizen of the United States, residing at New York city, in the county of New York and State of New York, have invented certain new and useful Improvements in Storage Batteries, of which the following is a specification, reference being had to the accompanying drawings.

This invention relates to improvements in storage batteries and more particularly to a cell construction for storage batteries.

An important object of the invention is to provide a cell construction of such character that sediment formed within the cells may be removed without the necessity of removing the cell covers therefrom.

A further object of the invention is to provide a device of this character whereby the above operation may be very readily accomplished, the cell being constructed of a plurality of separate elements connected together to form a unitary structure, the elements being separable for the purpose above set forth.

A still further object of the invention is to provide a combined cell and case structure which is capable of use without the necessity of providing the same with the ordinary wooden case generally employed.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a longitudinal vertical sectional view of a storage battery embodying my invention;

Figure 2 is a top plan view thereof; and

Figure 3 is a transverse sectional view.

Referring now more particularly to the drawings, the numeral 10 designates a rectangular frame open at its top and bottom and divided by transversely extending partitions 11 to form compartments 12. The numeral 13 designates a base adapted to co-act with the frame structure of substantially the same general outline, the lower end of the base being closed, as indicated at 14, and partitions 15 extending between the side walls to form in the base compartments 16 corresponding to the compartments 12 of the frame 10.

The frame 10 and base 13 are preferably formed of hard rubber and have interposed therebetween a gasket 17 formed of soft rubber or other similar compressible acid resisting material. This gasket is in the form of an outer frame 18 connected by cross bars 19 corresponding in number and arrangement to the partitions 11 of the frame 10 and 15 of the base 13, so that these cross bars are arranged between the adjacent ends of the partitions. The outer faces of the frame 10, base 13 and gasket 17 are provided with aligned slots 20 of sufficient depth to receive therein retaining bolts 21. At each end of the slots an angle brace 22 is arranged, these braces being preferably formed of brass and lead covered so that they are acid resisting. Through these braces bolts 23 are directed, being provided at their upper ends with nuts 24 by means of which the bolts may be tightened and the frame 10 and base 13 brought into clamping relation with the gasket to seal the outer shell of the cells and the partitions between the cells and sub-divide the casing thus provided into a plurality of cell compartments. At its ends, the frame 10 may be provided with handles 25 by means of which it may be lifted from or placed into a suitable receptacle such as ordinarily provided upon most automobiles therefor.

By an inspection of the drawings it will be rendered obvious that by simply loosening the nuts 24 of the bolts, the base of the battery may be removed and all sediment therein cleaned out, thus preventing the collection of this sediment about a point where it short circuits the battery and renders the same useless. The base 13 may of course be provided with the usual bridge pieces 26 if so desired for the support of the plates 27, the bars of which carry the covers 28. These covers will be placed in position with the usual composition 29 so that the upper ends of the battery are sealed in the same manner as the ordinary battery. It will be obvious that the features of construction permitting ready removal of the base will be a material advantage to the owner of the battery since the length of time necessary for removing the sediment is materially reduced and the cost of the operation likewise materially reduced. Ordinarily it is necessary to remove the composition 29 and cell covers 28 when the plates are removed and the cells themselves removed from the ordinary case for cleaning. By the above construction I am enabled to combine a plurality of cells in a single unit, making a complete battery without the necessity of assembling a plurality of devices, any one of which may become broken and destroy the efficiency of the remainder. It will furthermore be obvious that the construction as hereinbefore set forth is capable of some change of modification without materially departing from the spirit of my invention and I accordingly do not limit myself to such specific structure except as hereinafter claimed.

I claim:—

1. In combination, a rectangular frame having partitions dividing the same into a plurality of compartments, a base having its lower end closed and similarly divided into compartments, a gasket arranged between the frame and base and embodying portions extending between adjacent ends of the compartment walls, and clamping elements engaging the upper surface of the frame and the lower surface of the base to compress the base and frame upon said gasket.

2. In combination, a rectangular frame having partitions dividing the same into a plurality of compartments, a base having its lower end closed and similarly divided into compartments, a gasket arranged between the frame and base and embodying portions extending between adjacent ends of the compartment walls, and clamping elements engaging the upper surface of the frame and the lower surface of the base to compress the base and frame upon said gasket, said base and gasket being provided with aligned slots through which said clamping elements extend.

In testimony whereof I hereunto affix my signature.

JACK D. MINTZ.